Dec. 4, 1945.　　　　　J. W. ROSS　　　　　2,390,176
GLASS FEEDER
Filed Aug. 8, 1942　　　　3 Sheets-Sheet 2
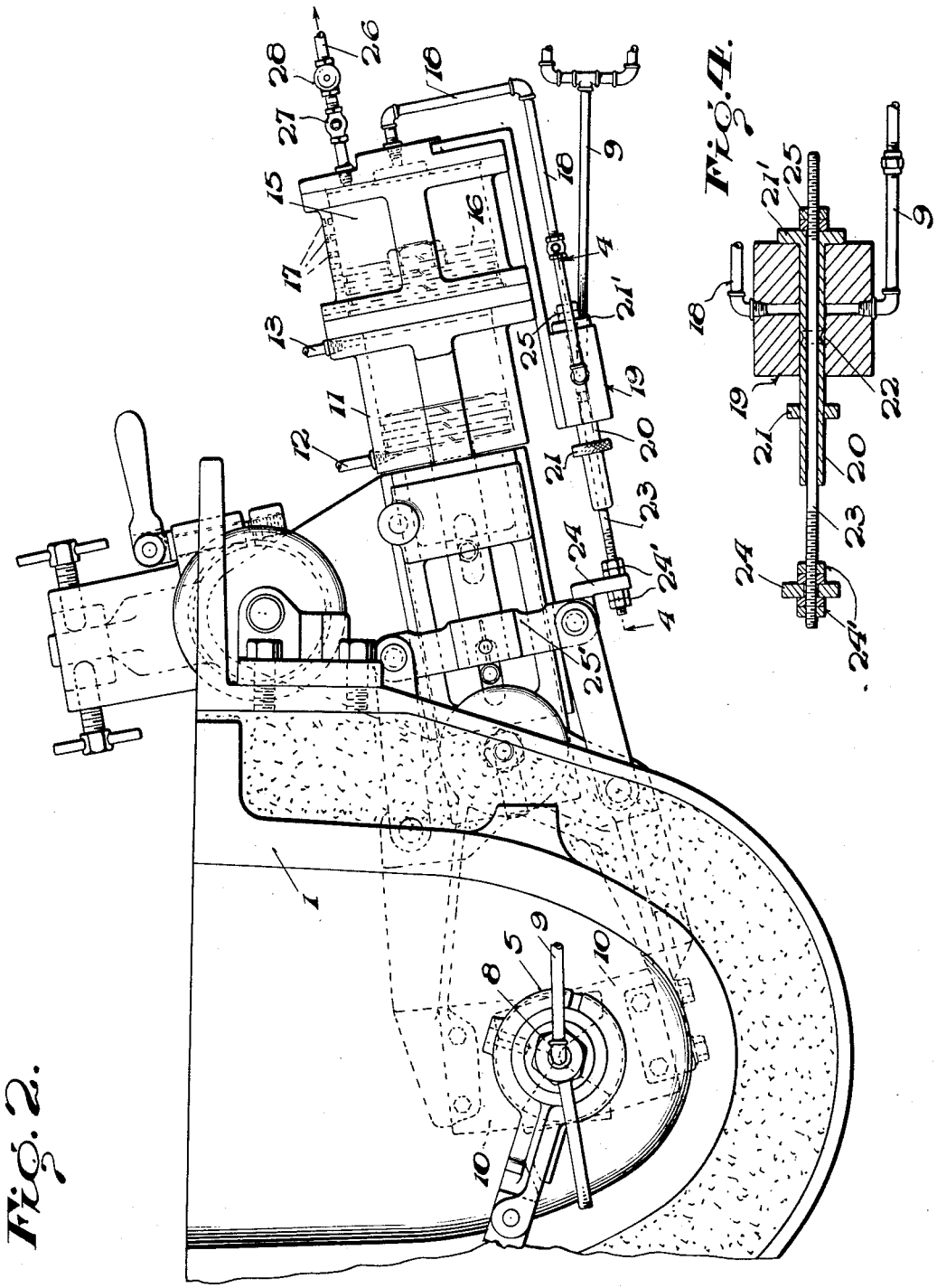
Inventor
James W. Ross.
By
Eccleston + Eccleston
Attorneys

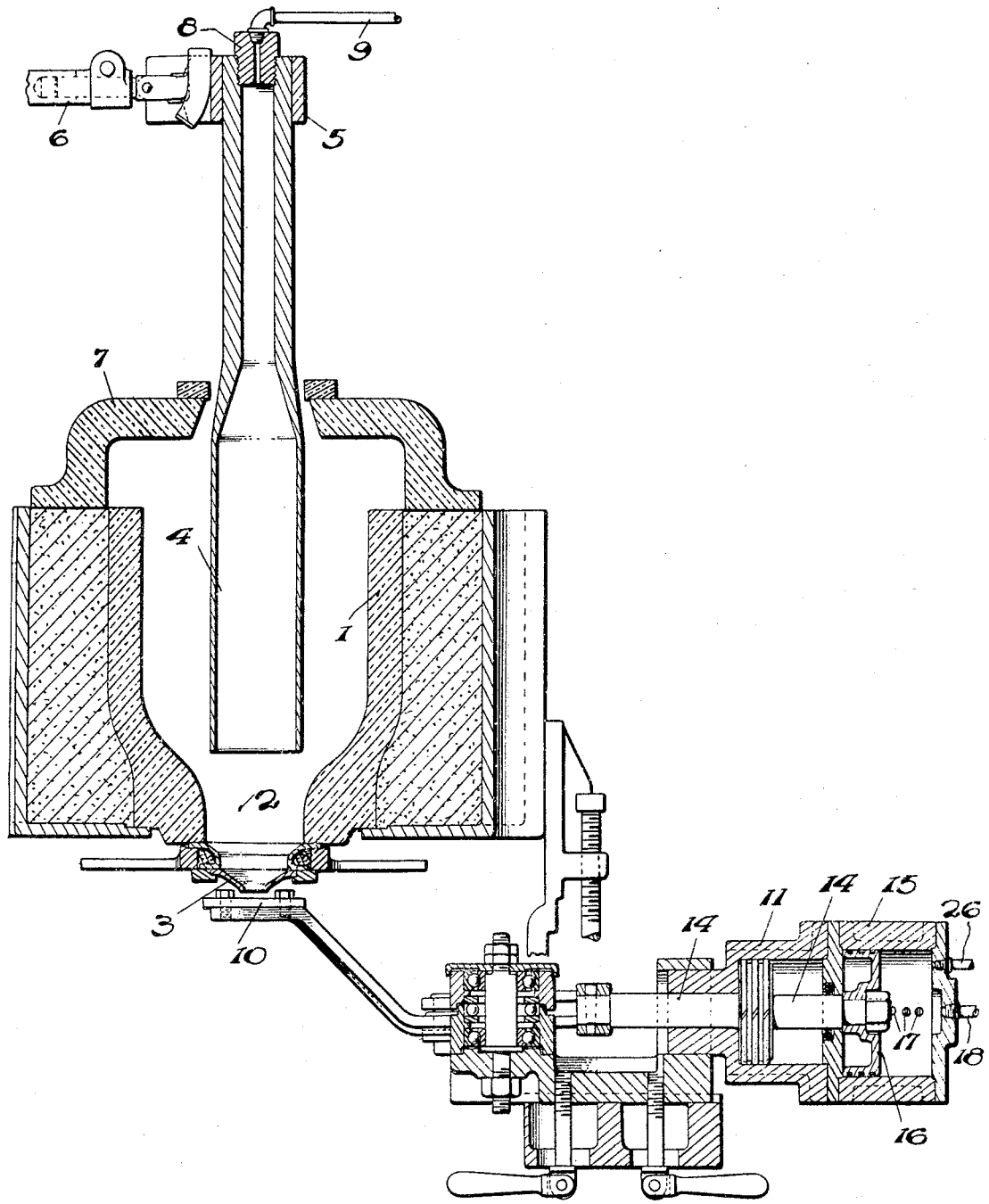

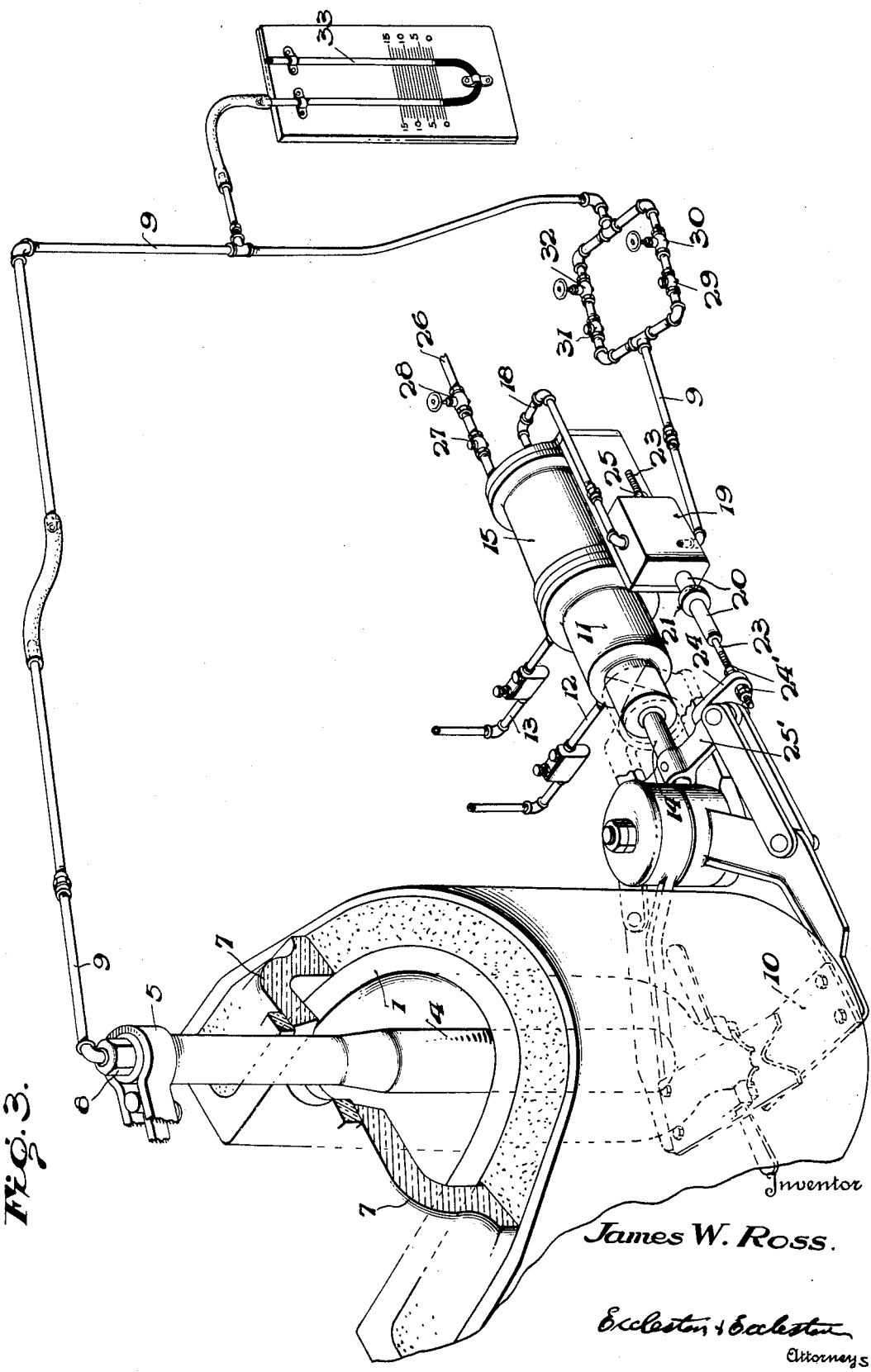

Patented Dec. 4, 1945

2,390,176

UNITED STATES PATENT OFFICE 2,390,176

GLASS FEEDER

James W. Ross, Washington, Pa., assignor to Hazel-Atlas Glass Company, Washington, Pa., a corporation of Pennsylvania Application August 8, 1942, Serial No. 454,174

6 Claims. (Cl. 49—55)

The invention relates to glass feeders, and particularly to glass feeders of the pneumatic type.

Pneumatic glass feeders, which are old and well known, form the charges or gobs of molten glass by the alternate application of pressure and vacuum to the surface of the glass delivered from a melting tank to the feeder.

One of the objects of the present invention is to provide a pneumatic feeder which is simple and inexpensive in construction, and yet which will give efficient control over the formation of the glass charges.

Another object of the invention is to provide means by which the duration of the application of vacuum, can be varied as desired.

Various other objects and advantages of the invention will be apparent to those skilled in the art, from the following detailed description, when taken in connection with the accompanying drawings, in which, Figure 1 is a vertical sectional view of the feeder and associated shears.

Figure 2 is a top plan view of the apparatus, with the nose block cover removed.

Figure 3 is a perspective view of the apparatus with parts broken away; and

Figure 4 is a sectional view taken on line 4—4 of Figure 2, on an enlarged scale.

Referring to the drawings in more detail, numeral 1 indicates the nose block which of course is associated with an ordinary flow spout or forehearth, not shown, and which leads to a glass melting tank. The molten glass flows from the melting tank into the forehearth or flow spout and thence to the nose block 1, which is provided with a flow orifice 2. Removably associated with the flow orifice is a bushing 3 which may be of any desired size, depending upon the size of the charges to be delivered. As this part of the construction is old and well known, further description thereof is unnecessary.

Arranged in the nose block, in vertical alignment with the flow orifice, is a tubular member 4 which may be made of refractory material or suitable metal. This tubular member has its upper end removably mounted in a clamp 5 attached to an arm 6. The tubular member may be of any desired size, and is vertically and laterally adjustable. As such adjusting means are old and well known, further description is unnecessary.

The nose block is preferably provided with a cover 7, and the tubular member extends downwardly through an opening in the cover into the glass in the nose block. The lower end of the tube will always extend into the glass, so that the lower end of the tube is always sealed.

The upper end of the tubular member is closed by a plug 8 which is secured thereto in airtight relation in any desired manner. The plug is provided with a passage therethrough and secured to the plug and opening into the passage is a pipe 9. This pipe communicates with the mechanism by which the pressure in the tube, over the glass therein, is alternately increased and decreased. Such mechanism will be presently described.

Numeral 10 refers to the shears which are arranged below the bushing 3, and which are for the purpose of severing the "gobs" or charges when they are formed, whereupon they drop into the molds of a glass forming machine.

The shears are of well known construction, and preferably are vertically and laterally adjustable by any desired means, which is also a common practice.

The shears are opened and closed by an air cylinder 11; air pressure being alternately admitted to opposite ends of the cylinder through pipes 12 and 13.

The piston rod 14 of the shear cylinder extends through the rear end of that cylinder into an adjacent cylinder 15 and carries a piston 16. Thus when the piston of the shear cylinder is reciprocated by admission of air pressure alternately to opposite ends of the cylinder, to open and close the shears, the piston 16 will be likewise reciprocated in the cylinder 15 and thereby create vacuum and pressure at the rear end thereof. In the particular form illustrated the cylinder 15 is provided with a number of holes or openings 17 at spaced intervals throughout substantially its length. Any number of these holes can be closed, as by plugs. As shown, the last two holes are closed, and thus during the forward travel of the piston vacuum will be created until the third hole is reached, whereupon air will be admitted to break the vacuum in the cylinder. And when the piston moves rearwardly pressure will not be created until the piston has closed the third hole. The open holes in the forward part of cylinder 15 prevent the creation of pressure or vacuum in that end of the cylinder.

Leading from the rear end of cylinder 15 is a pipe 18 which connects with a valve block 19. Leading from the valve block is the pipe 9 which communicates with the upper end of the tubular member 4.

Slidably mounted in the valve block is a valve sleeve 20 having flanges 21 and 21' which limit its movement. The valve sleeve is provided with an annular groove 22. This groove is so positioned that when the shears are open, the pipes 18 and 9 are in communication, and when the shears are moved from open position communication between these pipes is shut off.

The valve sleeve is reciprocated by a rod 23 which passes centrally through the valve sleeve and has its forward end connected by means of nuts 24' with a lug or arm 24 projecting from the yoke 25' which connects with the shear carrying arms. The rear end portion of the rod 23 is provided with a pair of nuts 25 which are preferably adjustable, as some slight adjustment may be desirable in setting up the apparatus.

Assuming that the shears are in open position the annular passage 22 will be so positioned that communication will be open between pipes 18 and 9, and the piston 16 having moved rearwardly air under pressure will have been forced from the rear end of cylinder 15, through pipe 18, annular passage 22 and pipe 9, to the upper end of the tubular member 4. And of course this air under pressure, acting on the surface of the glass in the tubular or bell member 4, will tend to force the glass downwardly through the flow orifice 2 and through the opening in the bushing 3.

Now when the shears move toward closing position, to sever the "gob," a vacuum will be created in the rear end of the cylinder 15, and thus vacuum will be applied to the surface of the glass in the tube, through pipe 18, annular groove 22 and pipe 9. Of course the vacuum will be broken, in the specific embodiment illustrated, when the piston 16 reaches the third opening 17 in the cylinder 15. But before the piston reaches the opening 17, the nuts 25 on the rod 23 have engaged the sleeve 20 and moved it to the left (Fig. 4) thereby cutting off communication between pipes 18 and 9, and thus maintaining the vacuum in the tube 4.

This application of vacuum lifts the glass in the tube as the charge is severed by the closing shears, and the vacuum is maintained to lift the remaining stub of glass from the shears while they are being opened. The parts are now in the position shown in Figures 2 and 4.

As the opening movement of the shears continues the application of vacuum will continue until the nuts 24' strike the sleeve 20 and move it to the right (Fig. 4). The rearward movement of the piston 16 will create pressure, and when the flange 21 strikes the valve block 19, the annular passage 22 will open communication between the pipes 18 and 9, so that the vacuum is broken and pressure is applied to the surface of the glass in the tube or bell 4, thereby aiding the gravity flow of glass in the formation of the next charge.

At times it is desirable to vary the duration of the application of the vacuum. and for this purpose I provide a pipe 26 leading from the rear end of the cylinder 15 and communicating with the atmosphere. This pipe is provided with a check valve 27 which permits only the outflow of air pressure, and also with a throttle valve 28 by which the volume of outflow is regulated. Thus a back pressure or throttling action may be provided against the rearward movement of the piston 16, and this may be varied by the operation of the valve 28.

This variable throttling action varies the duration of the application of vacuum. The vacuum is initiated when the piston starts its travel to the left (Fig. 1), and the vacuum remains effective until the return movement of the piston aligns groove 22 with pipes 18 and 9, whereupon pressure is admitted to the bell 4. Thus it is apparent that any action which delays the movement of the piston increases the duration of the application of vacuum. For example, if the valve is moved toward closed position, thereby reducing the volume of air which can escape, back pressure in the cylinder becomes greater and hence the movement of the piston is slower and the duration of the vacuum longer.

As shown in Figure 3, the pipe 9 is bifurcated at some point between valve block 19 and the tube 4; one branch being provided with a check valve 29 which permits the passage of air toward the tube 4, and a throttle valve 30 for regulating the volume; and the other passage being provided with a check valve 31 which permits the withdrawal of air from the tube 4 and a throttle valve 32 for regulating the volume.

There is also preferably provided a U-tube 33 containing mercury, and having one end communicating with the pipe 9 and the other end open to the atmosphere. The U-tube is so calibrated as to indicate at all times the level of the glass in the feeder tube 4.

The operation of the apparatus will now be described. The usual tank provides a continuous supply of molten glass which flows through an ordinary flow spout or forehearth to the nose block 1. The glass is at the desired level in the nose block, sealing the lower end of the feeder tube 4.

Let it be assumed that a glass charge has just been severed by the closing of the shears 10, so that the parts are in the positions shown in the drawings. The operation of the shear cylinder to close the shears caused the piston 16 in cylinder 15 to move forward, thereby creating a vacuum rearwardly of the piston. This vacuum in the cylinder has been broken by the piston passing an open port 17, but the vacuum in the feeder tube has not been broken, for the position of the valve stem 20 is such as to seal off the feeder tube from the cylinder, as shown in Figure 4. Thus the vacuum in the tube is effective to lift the remaining stub of glass from the shears.

Air pressure is now admitted to the front end of shear cylinder 11 to open the shears. This causes the piston 16 in cylinder 15 to move rearwardly to create pressure in the rear end portion of the cylinder. But it will be noted that such pressure is not communicated to the feeder tube until the opening of shears has moved the rod 23 rearwardly to the extent that the nuts 24' have engaged valve sleeve 20 and moved it rearwardly to align the annular groove 22 with pipes 9 and 18. Thus the pressure created in the rear portion of cylinder 15 is admitted to the feeder tube 4, thereby accelerating the gravity flow of the glass to form the next charge.

The rearward movement of the piston 16 can be varied by operating the valve 28 to vary the compression in the cylinder. Thus the duration of the application of the vacuum may be varied, as described hereinbefore.

When the shears are again moved toward closing position the vacuum created in the rear portion of the cylinder 15 will be at once applied to the feeder tube, and thus communication between the cylinder and feeder tube remains until the nuts 25 have engaged the valve sleeve 20 and moved the annular groove 22 out of alignment with the pipes 9 and 18. It will be understood, of course, that this movement of the valve sleeve does not break the vacuum in the feeder tube, but shuts off communication between the tube and the cylinder. As previously described, the U-tube 33 indicates to the operator the level of the glass in the feeder tube.

Having fully described the invention, what I claim is:

1. A glass feeder including a receptacle for the glass having a submerged flow orifice, a bell projecting into the glass in substantial alignment with the flow orifice, shears arranged below the orifice for severing the glass charges, a piston and cylinder for operating the shears, means for periodically creating vacuum and pressure, said means operated by said piston, a pipe line connecting the bell and said means, a valve in said line for controlling the application of vacuum and pressure to the bell, and an operative connection between said valve and said piston.

2. A glass feeder including a receptacle for the glass having a submerged flow orifice, a bell projecting into the glass in substantial alignment with the flow orifice, shears arranged below the orifice for severing the glass charges, a piston and cylinder for operating the shears, a piston and cylinder for periodically creating vacuum and pressure, the second-mentioned piston operated by the first-mentioned piston, a pipe line connecting the bell and the second-mentioned cylinder, a valve in said line for controlling the application of vacuum and pressure, and a lost-motion connection between said valve and a moving part of the shear operating apparatus.

3. A glass feeder including a receptacle for the glass having a submerged flow orifice, a bell projecting into the glass in substantial alignment with the flow orifice, shears arranged below the orifice for severing the glass charges, means for operating the shears, a piston and cylinder for creating vacuum and pressure, a pipe line connecting the bell and cylinder, a valve block in said line, a valve sleeve in said block and adapted to control communication between the bell and cylinder, and means connecting the valve sleeve with a moving part of the shear operating mechanism.

4. A glass feeder including a receptacle for the glass having a submerged flow orifice, a bell projecting into the glass in substantial alignment with the flow orifice, shears arranged below the orifice for severing the glass charges, means for operating the shears, a piston and cylinder for creating vacuum and pressure, a pipe line connecting the bell and cylinder, a valve block in said line, a valve sleeve in said block and adapted to control communication between the bell and cylinder, and a lost-motion connection between the valve sleeve and a moving part of the shear operating mechanism.

5. A glass feeder including a receptacle for the glass having a submerged flow orifice, a bell projecting into the glass in substantial alignment with the flow orifice, shears arranged below the orifice for severing the glass charges, means for operating the shears, a cylinder and piston for creating vacuum and pressure, said piston operated by the shear operating means, a pipe line connecting the bell and cylinder, a valve in said line for controlling the application of vacuum and pressure, an operative connection between said valve and a moving part of the shear operating means, said connection constructed to move said valve to shut off communication between the bell and cylinder before the vacuum in the cylinder is broken.

6. A glass feeder including a receptacle for the glass having a submerged flow orifice, a bell projecting into the glass in substantial alignment with the flow orifice, shears arranged below the orifice for severing the glass charges, means for operating the shears, a piston and cylinder for creating vacuum and pressure, a pipe line connecting the bell and cylinder, a valve in said line for controlling communication between the bell and cylinder, means for periodically operating said valve, and a valve associated with the cylinder for regulating the flow of air under pressure from the cylinder to atmosphere, to thereby regulate the speed of the piston in one direction.

JAMES W. ROSS.